US008612932B2

(12) United States Patent
Chen et al.

(10) Patent No.: US 8,612,932 B2
(45) Date of Patent: Dec. 17, 2013

(54) UNIFIED FRAMEWORK AND METHOD FOR CALL CONTROL AND MEDIA CONTROL

(75) Inventors: Wei Chen, Saratoga, CA (US); Zhiyu Liu, Beijing (CN); Xiaopu Zhu, Beijing (CN); Jose Maria de Castro, Jr., Orlando, FL (US)

(73) Assignee: Voxeo Corporation, Orlando, FL (US)

( * ) Notice: Subject to any disclaimer, the term of this patent is extended or adjusted under 35 U.S.C. 154(b) by 140 days.

(21) Appl. No.: 13/088,396

(22) Filed: Apr. 17, 2011

(65) Prior Publication Data

US 2011/0258597 A1 Oct. 20, 2011

Related U.S. Application Data

(60) Provisional application No. 61/325,355, filed on Apr. 18, 2010.

(51) Int. Cl.
*G06F 9/44* (2006.01)

(52) U.S. Cl.
USPC .......................................... 717/108; 717/107

(58) Field of Classification Search
USPC ................................................. 717/107, 108
See application file for complete search history.

(56) References Cited

U.S. PATENT DOCUMENTS

| | | | |
|---|---|---|---|
| 6,026,426 A * | 2/2000 | Badovinatz et al. .......... | 718/106 |
| 6,922,411 B1 | 7/2005 | Taylor | |
| 7,865,607 B2 | 1/2011 | Sonalkar et al. | |
| 2007/0280226 A1 * | 12/2007 | Sonalkar et al. .............. | 370/389 |

OTHER PUBLICATIONS

David M. Geary, Graphic Java 1.2, Sep. 21, 1998, Prentice Hall, 3rd Edition, pp. 172-238.*
Gamma et al., Design Patterns: Elements of Reusable Object-Oriented Software, Oct. 31, 1994, Addison-Wesley Professional, pp. 223-232.*
Gamma et al., "Façade," Design Patterns: Elements of Reusable Object-Oriented Software, Jan. 2000, Addison-Wesley, Reading, Massachusetts, pp. 185-193.
Gamma et al., "Chain of Responsibility," Design Patterns: Elements of Reusable Object-Oriented Software, Jan. 2000, Addison-Wesley, Reading, Massachusetts, pp. 223-232.
Notification of Transmittal of the International Search Report and the Written Opinion of the International Searching Authority, or the Declaration for International Application No. PCT/US2011/032909 mailed Aug. 31, 2011, 14 pages.
Listing of Claims for International Application No. PCT/US2011/032909 filed Apr. 18, 2011, 5 pages.
Non-final Office Action dated Jan. 10, 2013 in U.S. Appl. No. 13/187,253, 22 pages.

* cited by examiner

*Primary Examiner* — Anna Deng
(74) *Attorney, Agent, or Firm* — Davis Wright Tremaine LLP

(57) ABSTRACT

A communication system and method include a server hosting an interactive voice response or self-help application in a Java virtual machine. The communication application is programmed with a unified communication API, which is provided by a unified application framework. The API provides a set of unified class objects for call control and media control. The unified class objects are constructed from class object primitives of individual standards-based Java call control API and media control API. The constructs are a structured and restricted set conforming to the object model of the application and its states. The API has a unified event handler for both call and media controls and dispatches events to the application based on the type of event and the application state of the object model.

18 Claims, 13 Drawing Sheets

CALL Server

CALL another Endpoint

CALL Conference

APPLICATION OBJECT

CALL OBJECT

MIXER OBJECT

| <<interface>> |
| --- |
| MediaService |
| |
| + output(text : String) : Output<br>+ output(media URL) :Output<br>+ output(output : OutputCommand) : Output<br>+ prompt(text : String, grammar : String, repeat : int) : Prompt<br>+ prompt(media LIRL, grammar : String, repeat : int) : Prompt<br>+ prompt(output : OutputCommand, input : inputCommand, repeat : int) : Prompt<br>+ input(grammar : String) : Input<br>+ input(input : InputCommana) : Input<br>+ record(recording : URL) : Recording<br>+ record(command : RecordCommand) : Recording<br>+ getMediaGroup() : MediaGroup |

| <<interface>> |
| --- |
| MediaServiceFactory |
| |
| + create(parent : EventSource, Session : MediaSession) : MediaService |

MEDIA SERVICE OBJECT

FIG. 10

EVENT DIAGRAM

UNIFIED FRAMEWORK AND METHOD FOR CALL CONTROL AND MEDIA CONTROL

CROSS-REFERENCE TO RELATED APPLICATION

The benefit is claimed of U.S. provisional patent application of Wei Chen, Zhiyu Liu, Xiaopu Zhu, and Jose Maria de Castro, Jr, Application No. 61/325,355 filed on Apr. 18, 2010.

FIELD OF THE INVENTION

The present invention relates to telecommunication and a networked computer telephony system including the Internet and the Public Switched Telephone System, and more particularly to a system and method for implementing a unified framework for call control and media control.

BACKGROUND OF THE INVENTION

Two major telecommunication networks have evolved worldwide. The first is a network of telephone systems in the form of the Public Switched Telephone System (PSTN). This network was initially designed to carry voice communication, but later also adapted to transport data. The second is a network of computer systems in the form of the Internet. The Internet has been designed to carry data but also increasingly being used to transport voice and multimedia information. Computers implementing telephony applications have been integrated into both of these telecommunication networks to provide enhanced communication services. For example on the PSTN, computer telephony integration has provided more functions and control to the POTS (Plain Old Telephone Services). On the Internet, computers are themselves terminal equipment for voice communication as well as serving as intelligent routers and controllers for a host of terminal equipment.

The Internet is a worldwide network of IP networks communicating under TCP/IP (Transmission Control Protocol/Internet Protocol) suite. Specifically, voice and other multimedia information are transported on the Internet under the VoIP (Voice-over-IP) protocol.

The integration of the PSTN and the IP networks allows for greater facility in automation of voice applications by leveraging the inherent routing flexibility and computing accessibility in the IP networks.

An example platform for easy deployment of telephony applications is described in U.S. Pat. No. 6,922,411, which entire disclosure is incorporated herein by reference. Essentially, a networked telephony system allows users to deploy on the Internet computer telephony applications associated with designated telephone numbers. The telephony application is easily created by a user in XML (Extended Markup Language) with predefined telephony XML tags (e.g. VoiceXML) and easily deployed on a website. The telephony XML tags include those for call control and media manipulation. A call to anyone of these designated telephone numbers may originate from anyone of the networked telephone system such as the PSTN (Public Switched Telephone System), a wireless network, or the Internet. The call is received by an application gateway center (AGC) installed on the Internet. Analogous to a web browser, the AGC provides facility for retrieving the associated XML application from its website and processing the call accordingly.

This type of telephony platform allows very powerful yet simple telephony applications to be built and deployed on the Internet. The following are some examples of the telephony applications deployed on this platform. A "Follow me, find me" application sequentially calls a series of telephone numbers as specified by a user until one of the numbers answers and then connects the call. Otherwise, it does something else such as takes a message or sends e-mail or sends the call to a call center, etc. In another example, a Telephonic Polling application looks up from a database the telephone numbers of a population to be polled. It then calls the numbers in parallel, limited only by the maximum number of concurrent sessions supported, and plays a series of interactive voice prompts/messages in response to the called party's responses and records the result in a database, etc. In another example, a Help Desk application plays a series of interactive voice prompts/messages in response to the called party's responses and possibly connects the call to a live agent as one option, etc. In yet another example, a Stock or Bank Transactions application plays a series of interactive voice prompts/messages in response to the called party's responses and conducts appropriate transactions with a backend database or web application, etc.

The latter examples are generally referred to as self-help applications. In the voice context, a self-help application is referred to as IVR. IVR refers to Interactive Voice Response and is a technology that automates interaction with telephone callers. Enterprises are increasingly turning to IVR to reduce the cost of common sales, service, collections, inquiry and support calls to and from their company.

IVR solutions enable users using voice as a medium or other form of inputs through a voice channel to retrieve information including bank balances, flight schedules, product details, order status, movie show times, and more from any telephone. Additionally, IVR solutions are increasingly used to place outbound calls to deliver or gather information for appointments, past due bills, and other time critical events and activities.

FIG. 1 illustrates schematically a communication application environment. The communication application environment 10 includes one or more client interacting with a communication application server 200 in an application platform 100. The application platform 100 hosts an application specified by an application script 210 coded in object-oriented software. The communication application server 200 includes a browser 220 for interpreting and executing the application script 210. The execution of the application script invokes one or more server-side components 310 in the application server 200. Among the clients and the communication server, these components 310 provide services for call control, media control with one or more media server 230 and interactions with back-end systems 240 such as databases, and business logic and legacy systems such as CRM (Customer Relationship Management) and ERP (Enterprise Resource Planning). One example of the platform is to host an IVR application which interacts with voice, text messaging and other clients in a multi-channel environment.

The communication application platform provides a third-party call control between any numbers of clients 20, 22, 30. The application script 210 defines the communication application 300 and directs how a call is to be handled. For example, when a user makes a call through a voice client such as a handset 20 or a VoIP phone 22 to the IVR, the voice application script 210 associated with the call number is retrieved. The browser 220 executes or renders the retrieved voice application script to allow the user to interact with the voice application 300.

Communication of Multimedia information among endpoints and a third-party call controller generally require call control and media control.

FIG. 2A to FIG. 2C illustrate various call scenarios among a number of clients such as VoIP phones 22 or endpoints and a communication application server 200.

FIG. 2A illustrates a client in the form of a VoIP phone calling the communication application server. For example, the communication application server 200 hosts an IVR and the VoIP phone 22 calls the IVR. Call signaling and media are exchanged between the VoIP phone 22 and the application server 200.

FIG. 2B illustrates a first VoIP phone calling a second VoIP phone. As a third-party call controller, the application server 200 controls the call between the first and second phones. A call connection is established between the first phone 22-1 and the application server 200. Another call connection is established between the second phone 22-2 and the application server 200. The two calls are then joined at the application server to allow the first phone to talk to the second phone. In this scenario, media can be handled in one of two modes. In the bridged mode, media exchanged between the two phones are routed through the application server. In the direct mode, the media is exchanged directly between the two phones.

FIG. 2C illustrates three phones in conference. In this scenario, each phone establishes a call to the application server. The three calls are then joined or mixed at the application server to provide a conference facility.

For call control, a number of protocol standards have been put forward for interoperability. For example, the H.323 standard is a protocol standard recommended by the ITU (International Telecommunication Union) for signaling and call control of IP telephony.

An increasingly popular alternative to the H.323 standard for call control is SIP ("Session Initiation Protocol".) SIP is an IETF (Internet Engineering Task Force) protocol for signaling and call control of IP telephony and multimedia communication between two or more endpoints. It is text-based and more web-centric and is a comparatively simpler and more light-weight alternative to H.323.

In the traditional web paradigm, a user agent in the form of a client machine running a web browser makes a request to a web server. The web server returns a response to the request. The communication is taking place under the HTTP (Hypertext Transfer Protocol). Specifically, the web browser requests a web resource such as a web page as specified by an URL from a web server. Typically the web server responds by returning the requested web page. The web page may contain text content with embedded instructions for the browser to render the text in the web page. In more sophisticated applications, a web page is often generated dynamically by employing server-side programs and may incorporate content as queried results from backend databases. Thus, some of the content are not hard-coded on the web page but are generated and rendered dynamically by the web server. The server-side programs may also serve to post data from the client to the backend databases.

Traditionally, these server-side programs are implemented as scripts conforming to the CGI protocol (Common Gateway Interface). The CGIs are code modules that perform the task on the web server to generate and render dynamic content or perform other backend functions.

However, CGI has several disadvantages. First, it is not very portable, as different web serving machines with different processors and operating systems may require their own versions of scripts. Secondly, it does not use the server resource efficiently. The different GCIs are run in a different process context than the server which starts them. There is the overhead of creating a new process for each request and the different processes do not have access to a common set of server resources.

The JAVA™ servlet model addresses the disadvantages of the CGI. Servlets are modules written in the highly portable JAVA™ programming language as they run in the same virtual JAVA machine, which is independent of the processor hardware or the operating system. In the objected-oriented Java programming language, the HTTP requests are parsed and made to interact with software objects modeled on the real objects that operate with the application. Similarly, the responses are made to conform with the HTTP protocol before being sent to the requester. Servlets runs in a multi-tread environment in the Java server and allows each request to be handled by a separate tread. Also one instance of the Java scripts need be loaded into the processor memory as compared to CGI where contemporaneous requests require multiple copies of the CGI scripts to be loaded. The original servlets conform to the HTTP protocol and may be regarded as "HTTP servlets". The servlet model provides a set of API (Application Programming Interface) that is implemented by loading a corresponding servlet container in the application server. The servlet model enables developers to rapidly develop applications and to port them to different servers and be able to run them efficiently. It is widely used in web applications and is based on open standards.

The API is an abstraction that describes an interface for the interaction with a set of functions used by the components. It is a list containing the description of a set of functions that is included in a library and that address a specific problem. In the current context of Java object oriented languages, it comprises a description of a set of Java class definitions and extension class definitions with a set of behaviors associated with the classes. The API can be conceived as the totality of all the methods publicly exposed by the classes (the class interface). This means that the API prescribes the methods by which one handles the objects derived from the class definitions.

For call control, a SIP servlet has been developed and established as a standard to handle requests under the SIP protocol, just as the HTTP servlet handles requests under the HTTP protocol.

FIG. 3A illustrates an existing implementation of the call control objects of the server-side components of the communication application shown FIG. 1 being implemented as SIP servlets. The call control objects are in the form of SIP servlets 320. This is possible through the implementation of a SIP servlet container 340 and a SIP servlet call control API 350.

The SIP Servlet Specification (JSR 289) is a container based approach (modeled on the HTTP servlet paradigm) to developing communication applications utilizing the Session Initiation Protocol (SIP) protocol. A SIP servlet is a Java programming language server-side component that perform SIP signaling. SIP servlets are managed by a SIP servlet container, which typically is part of a SIP-enabled application server. SIP servlets interact with clients by responding to incoming SIP requests and returning corresponding SIP responses. SIP servlets are built of the generic servlet API provided by the Java Servlet Specification which is established as an open standard by the Java Community Process (SM) Program through the Java Specification Request (JSR) process.

Using a SIP servlet (JSR 289) for call control is to leverage the benefits of the servlet model. It also provides a Java API independent of underlying media server control protocols.

U.S. Pat. No. 7,865,607 B2 discloses a servlet model for media rich applications. The SIP servlet for call control is augmented by a media control API. However, the media control API is custom and does not conform to the servlet model.

For media control, media control objects are being supported by a standards-based media control API, JSR 309 as shown in FIG. 3A. Thus, media server specifics are handled by a JSR 309 Driver, allowing an application developer to program using the JSR 309 API, independent of the media server vendor. In this way, the applications can work with different media servers that are deployed by different operators and service providers.

Thus, an application developer can develop components of a communication application in terms of low level call control objects and API in the form of a SIP Servlet based on the open standards JSR 289 and in terms of low level media control objects and API in the form of the open standards JSR 309.

One disadvantage of working with low level and generic objects and their APIs is that the developer has to repeatedly deal with low level details even if many of these details are irrelevant when the object being modeled is in certain states.

FIG. 3B illustrates how the existing implementation of the application has to deal with every event under the standard call control and media control API shown in FIG. 3A. For example, the SIP servlet receives a BYE request to end a call. It examines what state it is in to act according. In the case when it is still in a "CONNECTED" state, it will call the doBYE method to end the connection and perform related call teardown and cleanup tasks. However, a user may decide to hang up a call even before the call connection is established. In that case, it is not even in the "CONNECTED" state and therefore given the state, there was no need for the servlet to receive the BYE request and to perform any call teardown tasks. Nevertheless, in the current implementation, every time the BYE request is received, the servlet will have to check against its state and act accordingly. Thus, the added burden of checking and dealing with irrelevant requests becomes part of the application code. The same is true for the media events and the application has to furnish the logic and additional codes to deal with events which may not be applicable to the current state.

It is desirable for an application to be developed without having to deal with details irrelevant to the object model being dealt with. Furthermore, it is desirable to have a systematic and uniform way of working with call control and media control events, without having to deal with their low level details in the application so as to have succinct and efficient codes.

SUMMARY AND OBJECTS OF THE INVENTION

According to a general aspect of the invention, a communication system includes a server hosting a communication application in a Java virtual machine. The communication application is programmed with a unified communication API. The unified communication API is in a unified communication framework layer on top of a standards-based call control API and a standards-based media control API. The unified communication API provides access to unified class objects for an object model of the application. The unified class objects are constructed from primitive class objects from the individual call control API and the media control API.

According to one aspect of the invention, the unified class objects include an event source object which handles the normally separate events of the call control API and media control API in a unified manner. In particular, the event source object only dispatches events to the application based on the type of event and the state of the application, consistent with the object model of the application.

In this way, the application can expediently be built from Java class objects tailored to the object model of the application where the class objects are based on the primitive Java class objects of the standards-based API. At the same time, the programming of the application is simplified as it can focus on the business logic rather than to deal with the low-level details of the primitive class objects.

Additional objects, features and advantages of the present invention will be understood from the following description of its preferred embodiments, which description should be taken in conjunction with the accompanying drawings.

BRIEF DESCRIPTION OF THE DRAWINGS

FIG. 10 illustrates the media service object in a UML diagram.

UNIFIED FRAMEWORK FOR CALL CONTROL AND MEDIA CONTROL

According to a general aspect of the invention, a communication system includes a server hosting a communication application. The communication application is programmed with a unified communication API. The unified communication API being in a unified communication framework layer on top of a standards-based call control API and a standards-based media control API. The unified communication API provides access to unified objects constructed from primitive objects from the individual call control API and the media control API.

A software framework, in computer programming, is an abstraction in which common code providing generic functionality can be selectively specialized by user code providing specific functionality. Frameworks are a special case of software libraries in that they are reusable abstractions of code wrapped in a well-defined API, yet they contain some key distinguishing features that separate them from normal libraries. In this case, the unified communication API represents a further abstraction from the primitive call control and media control APIs that more closely models the real situation being addressed by the application.

The abstraction to a higher-level object models facilitates software development by allowing designers and programmers to devote their time to meeting software requirements rather than dealing with the more standard low-level details of providing a working system, thereby reducing overall development time.

Figure 4:
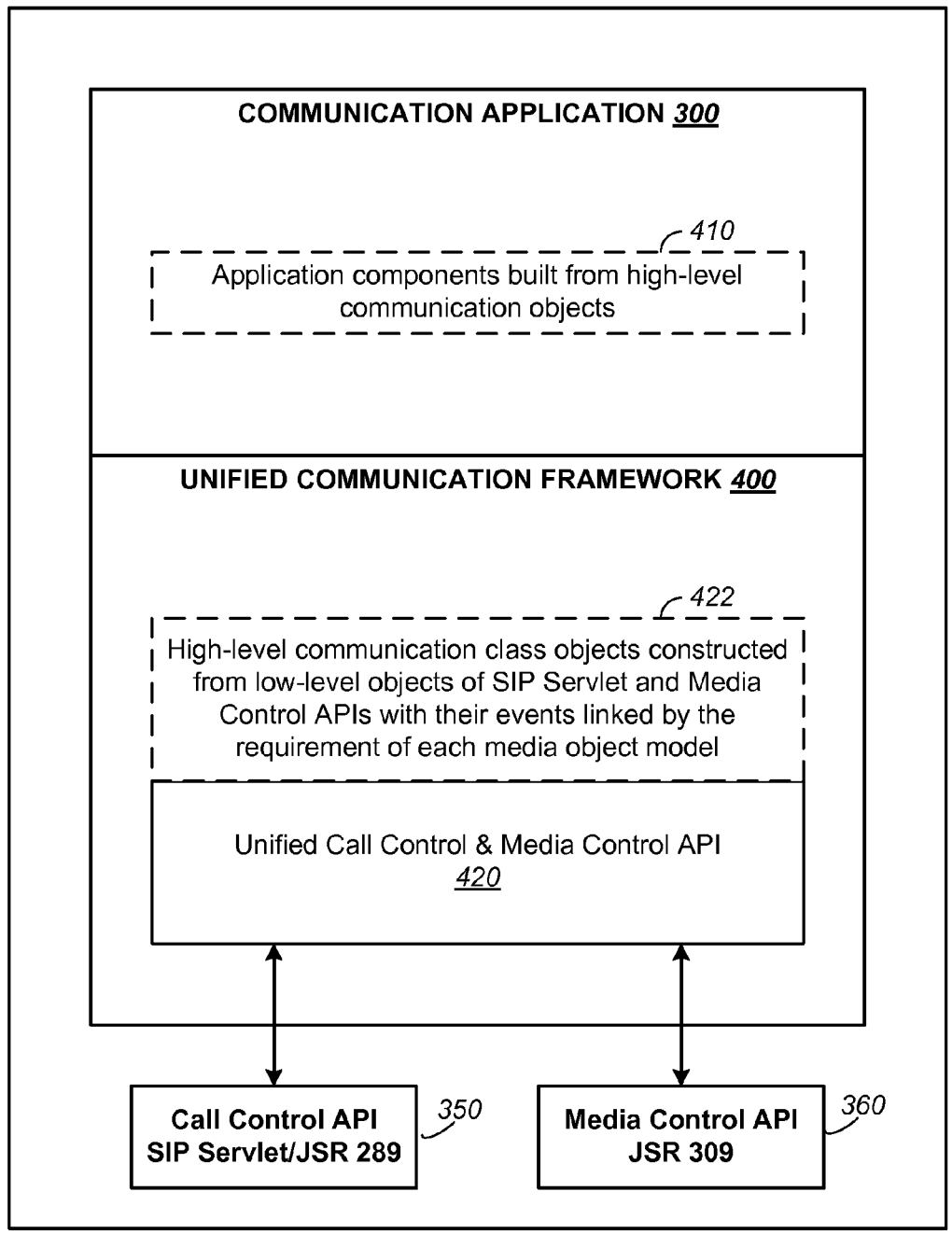
FIG. 4 illustrates schematically a general implementation of the unified communication framework.

FIG. 4 illustrates schematically a general implementation of the unified communication framework. A unified call control and media control API 420 is provided in the unified communication framework 400. The unified API 420 defines a set of class objects 422 (unified communication objects) that is a higher level abstraction of the object model. The unified communication objects 422 are higher-level constructs of the primitive objects defined by the lower-level call control API 350 and media control API 360. Thus, instead of the components of an application being built from manipulation of the primitive objects, they are built from those of the unified communication objects.

Figure 5:
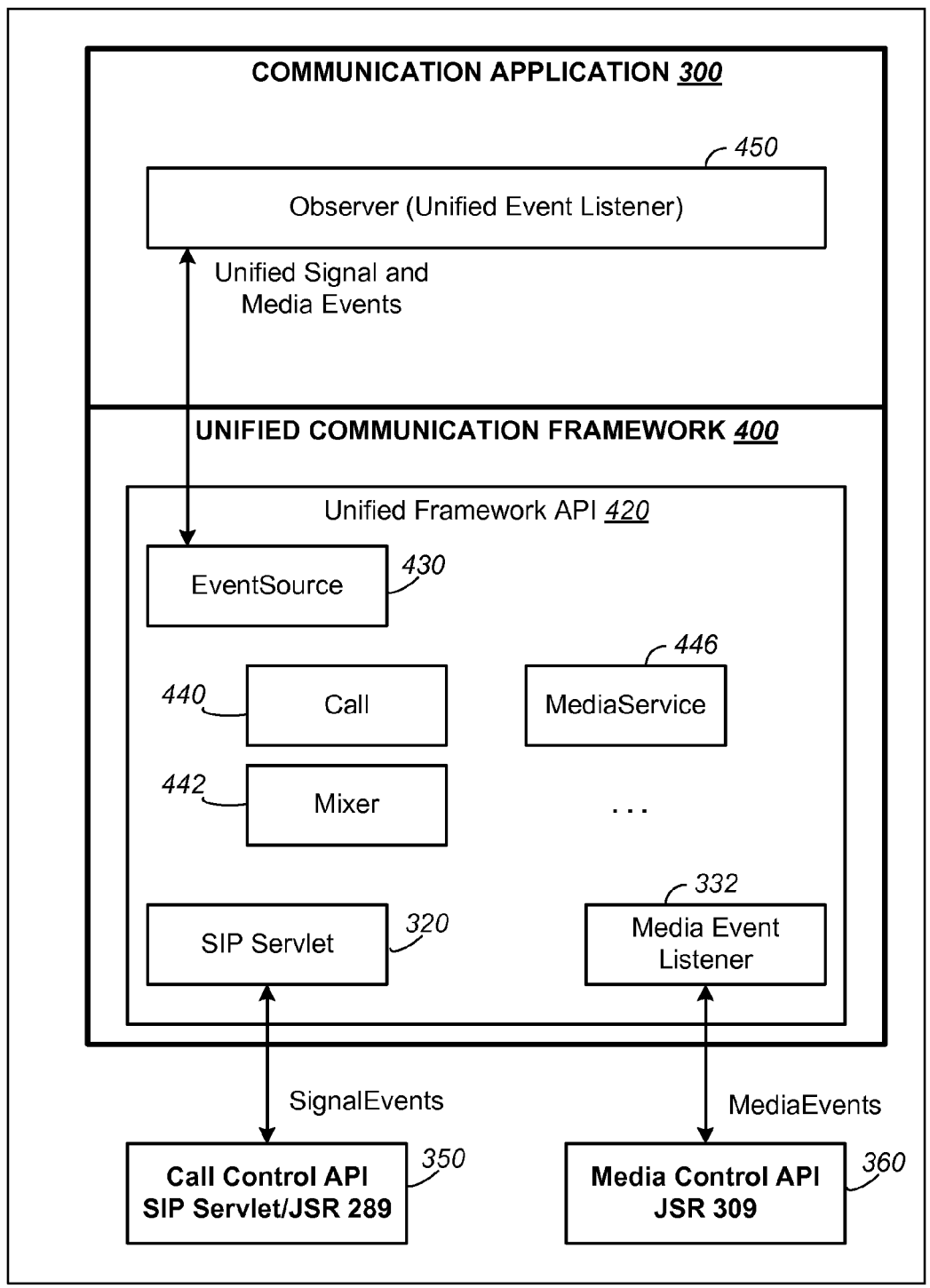
FIG. 5 illustrates the implementation of a unified communication framework for programming communication applications in which a communication server acts as a 3rd party call control and media control similar to that shown in FIG. 1 and FIGS. 2A-2C.

FIG. 5 illustrates the implementation of a unified communication framework for programming communication applications in which a communication server acts as a 3rd party call control and media control similar to that shown in FIG. 1 and FIGS. 2A-2C. It builds upon SIP Servlet (JSR 289) API 350 and Java Media Control (JSR 309) API 360 by providing a unified model for both call and media control while still exposing direct access to the lower JSR 289/309 APIs. However, the object model is generic enough to allow implementation on top of other protocol, such as Jingle, and other type of communication, such as Instant Messaging. The unified communication framework provides a unified framework API 420 which includes a set of unified communication object classes. A communication application can be coded in terms of manipulation of these unified communication objects classes as well as the primitive object classes of the JSR 289 and JSR 309 APIs. Examples of these unified communication objects are Call 440, Mixer 442, MediaService 446, EventSource 430, SIP Servlet 320, MediaEventListener 332, observer 450, etc.

The advantage of building applications with a unified communication framework is that the application is built with high-level objects more specific to the application in question. Call control and media control events are tied to the specific behaviors of these high-level objects resulting in a more systematic and uniform way of working them, without having the application to deal with low-level details. In this way, low-level details irrelevant to the object model are shielded from the application developer and the application codes are more concise and efficient.

Figure 6:
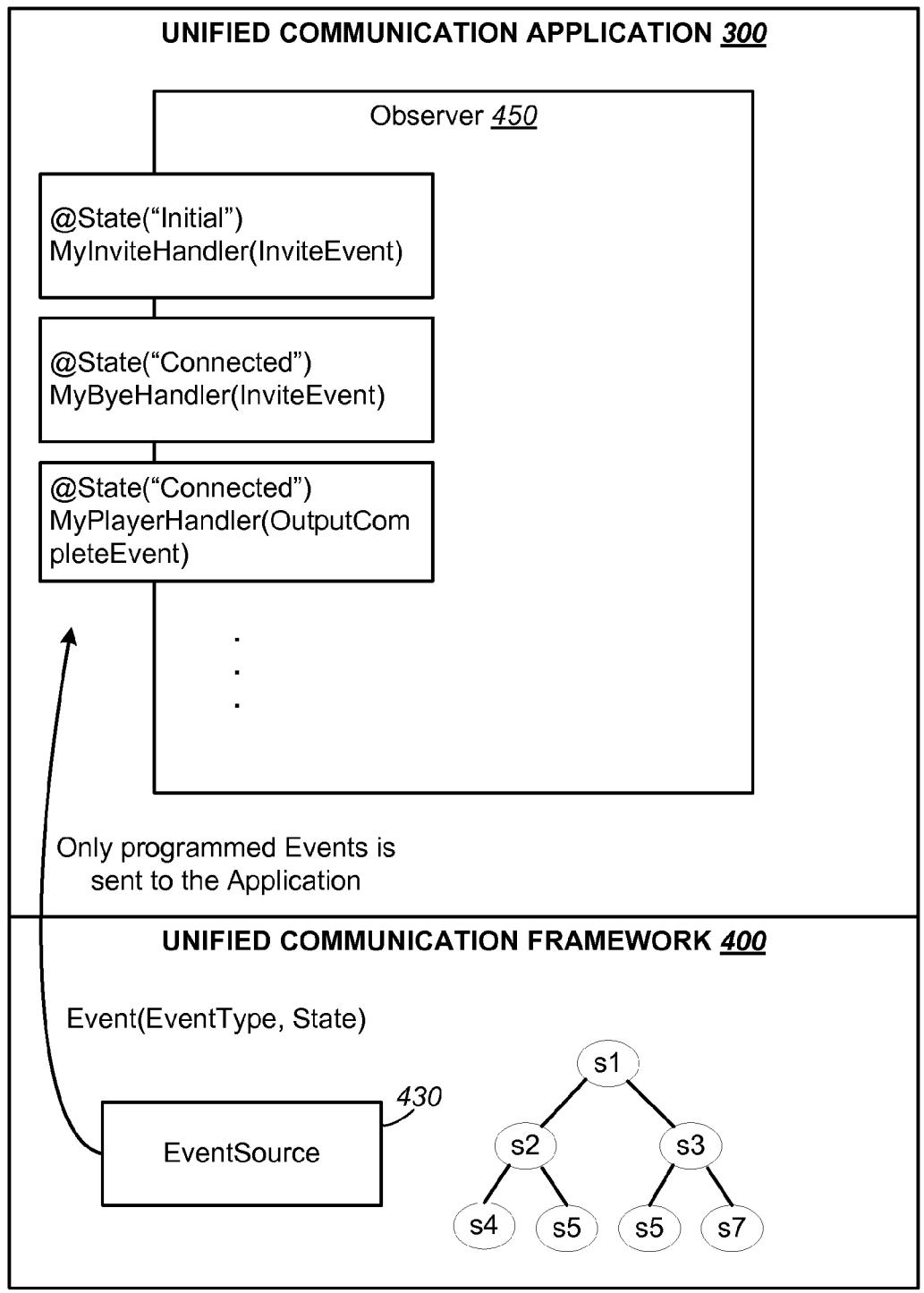
FIG. 6 illustrates examples of the efficient handling of events by an application in the unified communication framework.

FIG. 6 illustrates examples of the efficient handling of events by an application in the unified communication framework. A unified event handling is implemented by the unified event source object 430 and the observer object 450. The unified event source object, EventSource 430 serializes both call control events and media control events such that the application component listening to the event source only has to deal with one event at a time. The application 300 incorporates the observer object 450 which listens to events from the unified event source object 430. The observer object 450 defines event handling methods which have a single parameter and whose type is the type of events generated by the unified event source object 430. The event handling methods define @State annotation as defined by the unified application framework. The unified event source object 430 dispatches events to the event handling method when the type of event either matches the type of the single parameter defined in the even handling method or is the supertype of the type of the single parameter. If the value of the @State annotation is not empty, the unified event source object only dispatches events to the event handling method when the value of @State annotation matches the state property of the unified event source object.

Thus the observer object 450, will receive events coming from the EventSource 430 which are only appropriate in certain application state. For example, the application can only begin to consider an invite to become part of a call after the application has been initialized (i.e., in the state "Initial".) When that event is received, the application will then invoke the MyInviteHandler to process the invite. Similarly, the event (i.e., BYE) to terminate a call with its associated teardown and cleanup operations will only be appropriate after the call has actually been established (i.e., in the state "Connected".) When that event is received, the application will then invoke the MyByeHandler to process the BYE. Similarly, the OutputCompleteEvent event to play media is appropriate in the context when the application is in the "connected" state. When that event is received, the application will then invoke the MyPlayerHandler to process the media.

Figure 1:
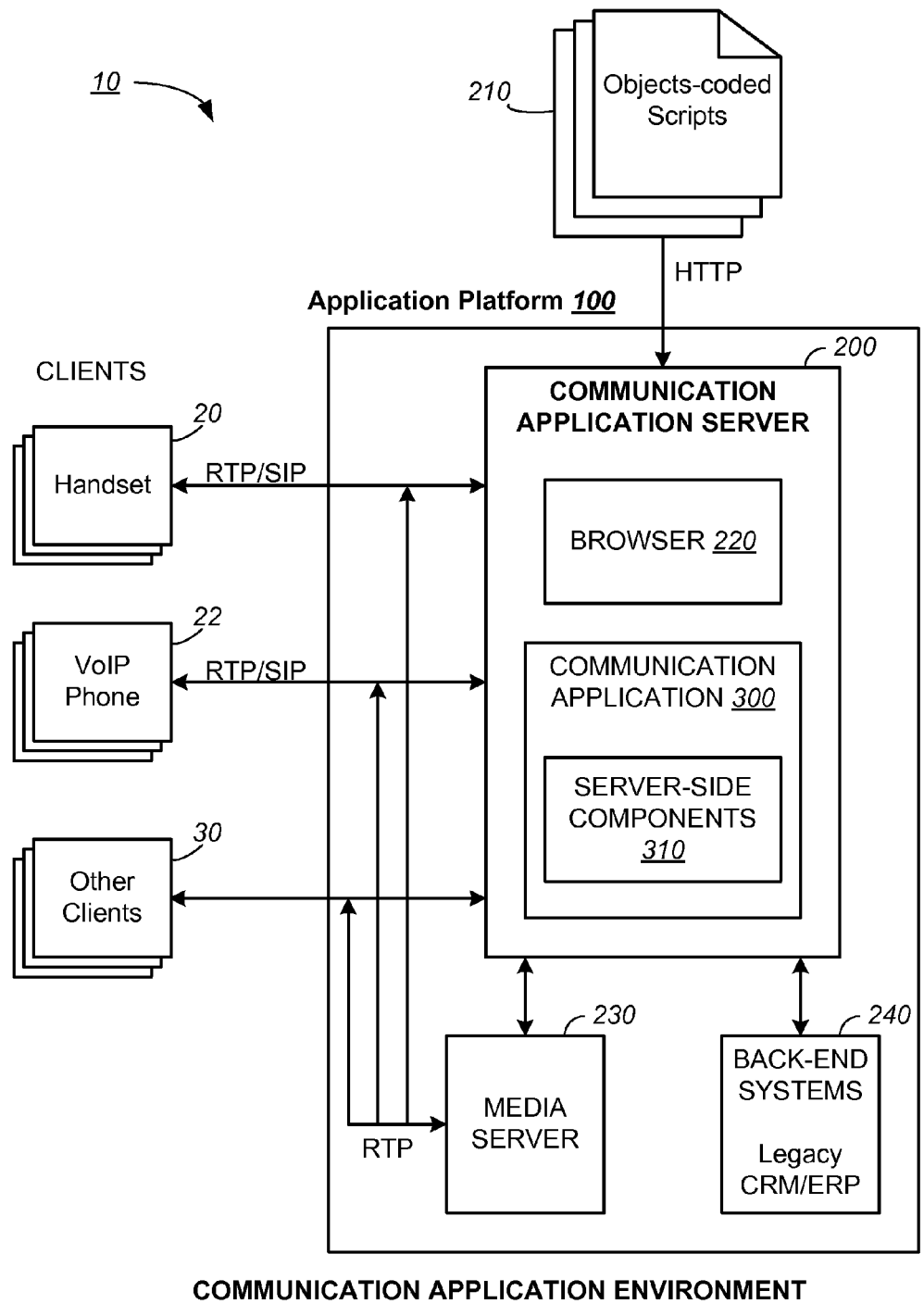
FIG. 1 illustrates schematically a communication application environment.
Figure 2A:
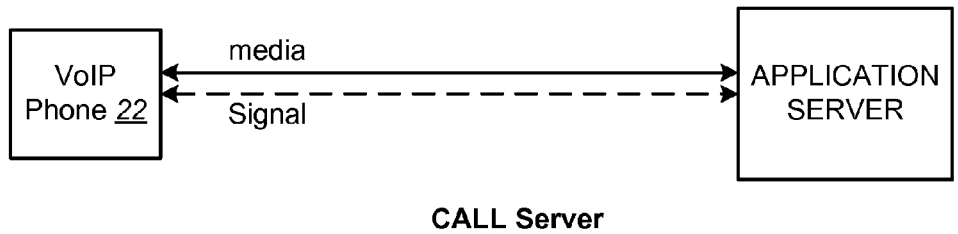
FIG. 2A illustrates a client in the form of a VoIP phone calling the communication application server.
Figure 2B:
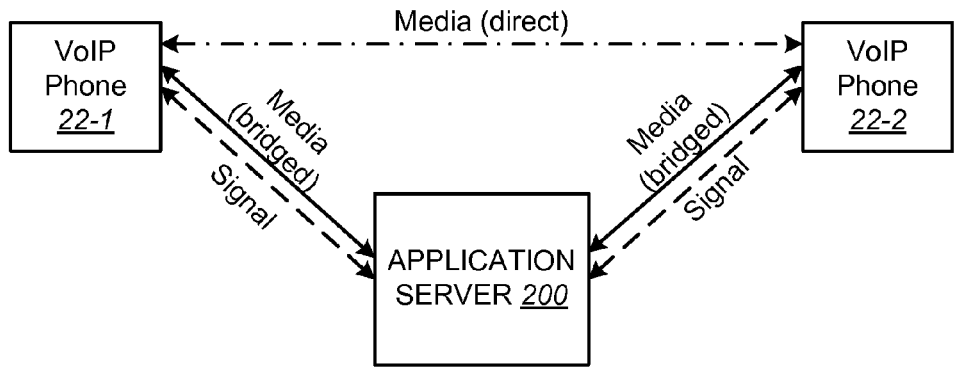
FIG. 2B illustrates a first VoIP phone calling a second VoIP phone.
Figure 2C:
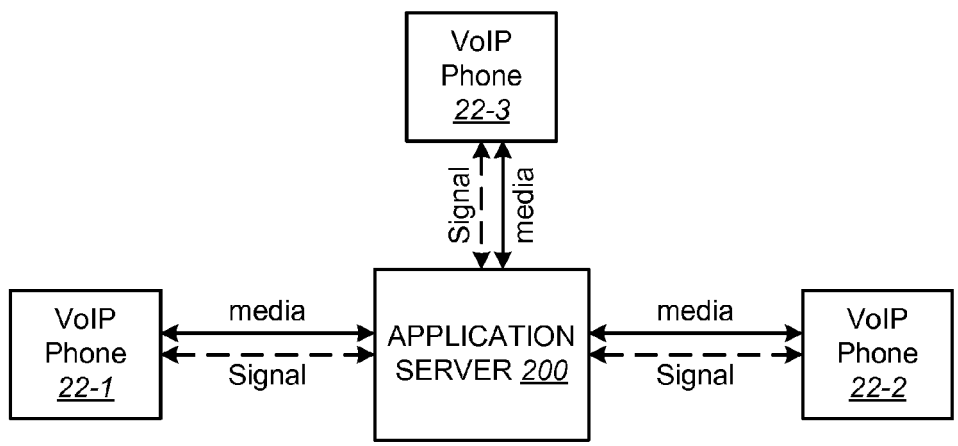
FIG. 2C illustrates three phones in conference.
Figure 3A:
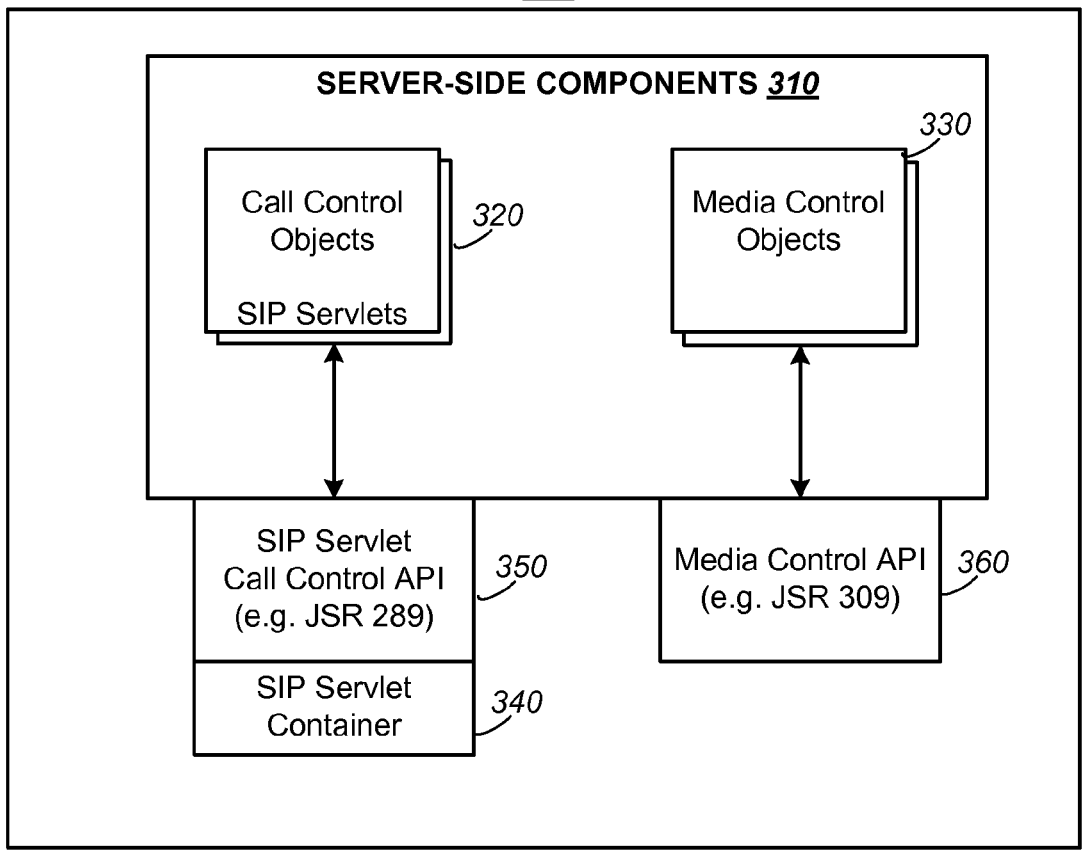
FIG. 3A illustrates the call control objects of the server-side components of the communication application shown FIG. 1 being implemented as SIP servlets.
Figure 3B:
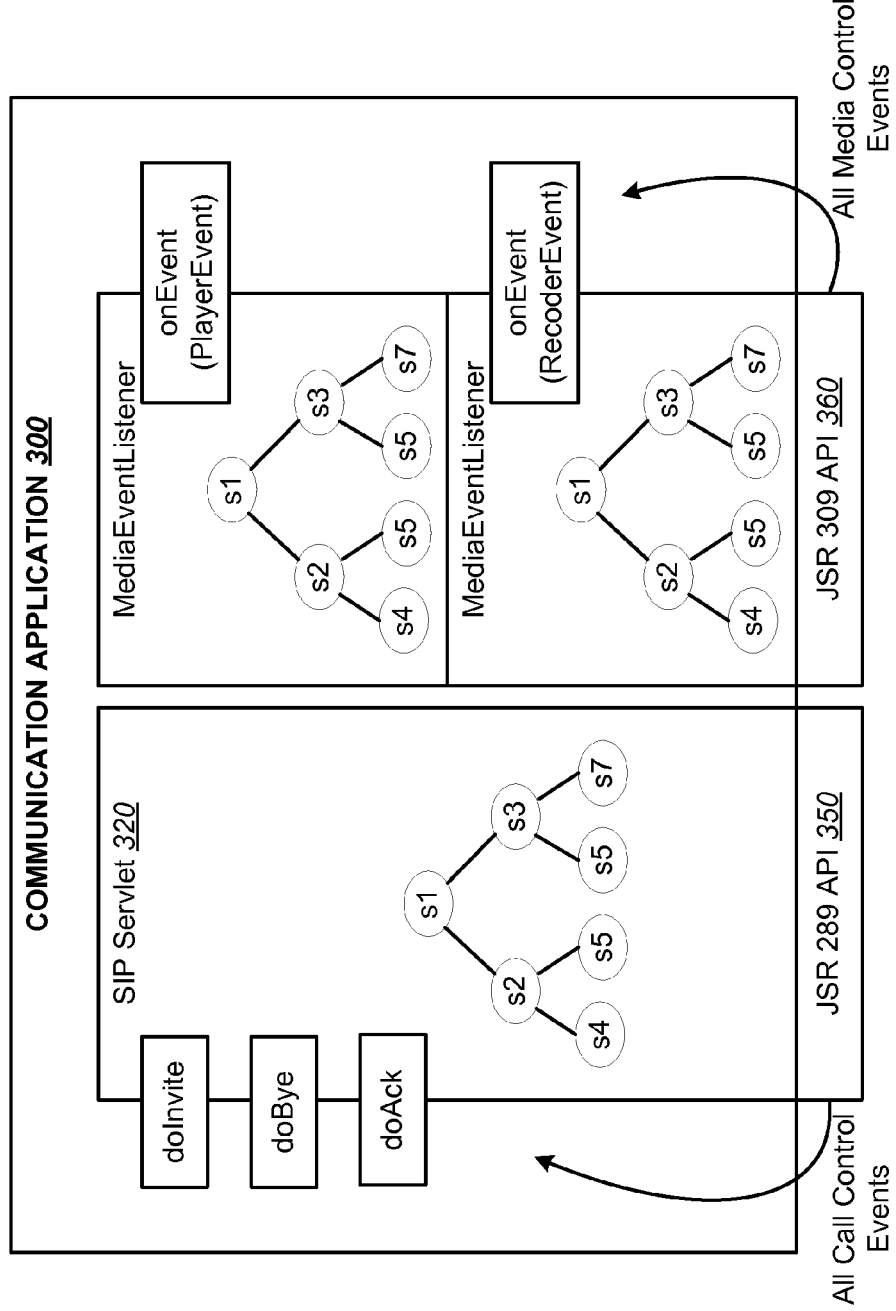
FIG. 3B illustrates how the application has to deal with every event under the standard call control and media control API shown in FIG. 3A.

Unlike the prior example shown in FIG. 3B, where the application has to listen to and process every events generated by the JSR 289 API and the JSR 309 API, these events are first handled by the EventSource object 430 in the unified communication framework. The EventSource will only send selective, programmed events to the application. For example, if the event is BYE and the state is "connected", it will send the event to the application. On the other hand, if the state is "not connected", it will not send the event to the application. By dealing with high-level objects abstracted from low-level objects of JSR 289 and JSR 309, programming at the application level is more efficient and relevant to the problems at hand.

The call control model of the unified communication framework is designed for calls and media that are controlled by a 3rd party server application, such as PBX, IVR, Conferencing, and Call Center applications. It assumes all the calls have at least their signals controlled by the communication application. In most cases, media should preferably be controlled by the communication application as well.

TABLE 1 lists example classes/objects related to call control of the unified communication framework in the preferred embodiment.

TABLE 1

| CLASS | DESCRIPTION |
| --- | --- |
| Application | Defines lifecycle callbacks and inbound call handling for a unified communication application. |
| Observer | A weak-typed listener that can listen on both SignalEvent and MediaEvent. The unified framework supports dispatching event to Observers based on event type and state. |
| Call | A call is a leg of communication from an Endpoint to Application. The leg must have signal controlled by the Application, optionally media as well. |
| InviteEvent | Invitation is an incoming call alert. This is a key event to start the call control. |

TABLE 1-continued

| CLASS | DESCRIPTION |
|---|---|
| Participant | This represents an abstract party involved in a conversation |
| MultiStreamParticipant | A type of Participant which can have multiple media streams |
| Mixer | This is used to mix multiple.Participants together. A mixer is also a Participant, so other Participants can be joined/unjoined to a Mixer. The media streams of joined participants are mixed (or add, or sum) into a single stream, then the result stream is sent out to every joined Participant. |
| Conference | Represents a real conference that other Participant can join/unjoin. Every Participant that joined a conference receives media from all other participants in the same conference. |
| Join | A Joint represents the result of the asynchronous join operation on Participant. Extends the Future interface, so can be used to check if the join operation is complete, to wait for its completion, and to retrieve the result of the operation. |

Figure 7:
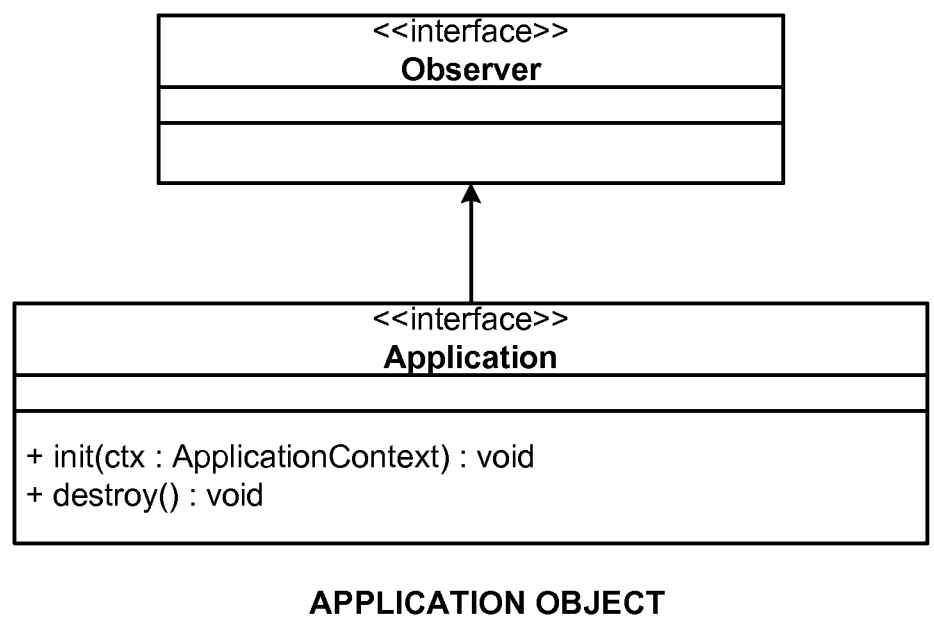
FIG. 7 illustrates the Application object in a UML (Unified Modeling Language) diagram.

FIG. 7 illustrates the Application object in a UML (Unified Modeling Language) diagram. It is responsible for lifecycle management by implementing init( ) and destroy( ). Also it observes inbound calls by implementing an observer method that takes a type of SignalEvent.

Borrowing the concept from CCXML and JSR 309, the unified framework uses various join method to connect different call legs. A Participant can join with other Participants. Individual streams in MultiStreamParticipant can be joined by using JSR 309 Joinable construct. The unified framework also supports multiple joins with automatic join degradation.

Typically an inbound call results in an InviteEvent sent to the Application. The application can decide to accept, reject, or redirect the InviteEvent. Once the InviteEvent is accepted, a Call (leg) is formed. Observer can be added on the Call to continue monitor and control the leg. The application can further join the Call with the media server, or join the Call to another Endpoint, or join the Call to another Participant.

Figure 8:
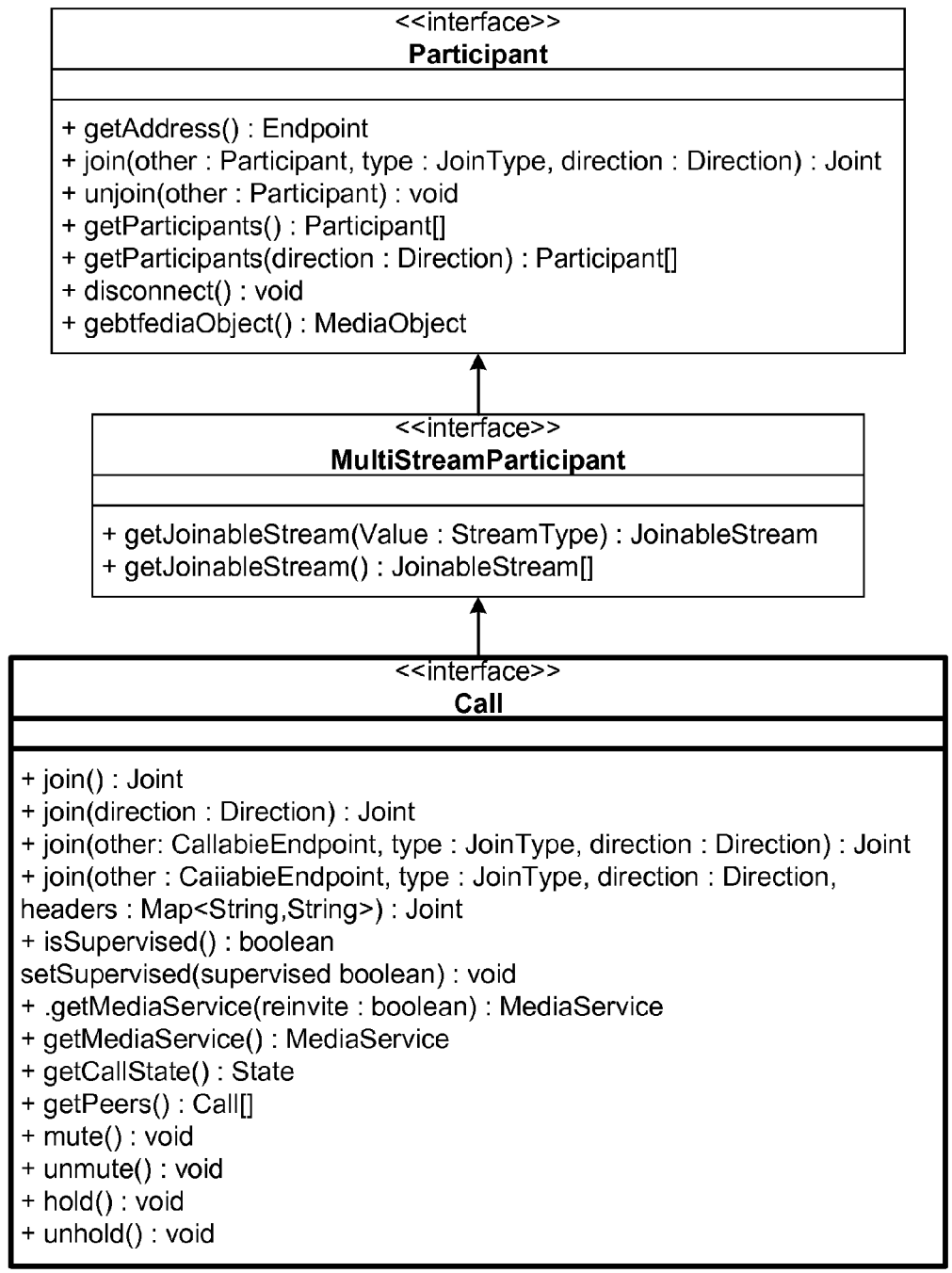
FIG. 8 illustrates the Call object in a UML diagram.

FIG. 8 illustrates the Call object in a UML diagram. It has a number of methods including join, getMediaService, mute, unmute, etc. It also inherits from the MultiStreamParticipant object which in turn inherits from the Participant object.

Figure 9:
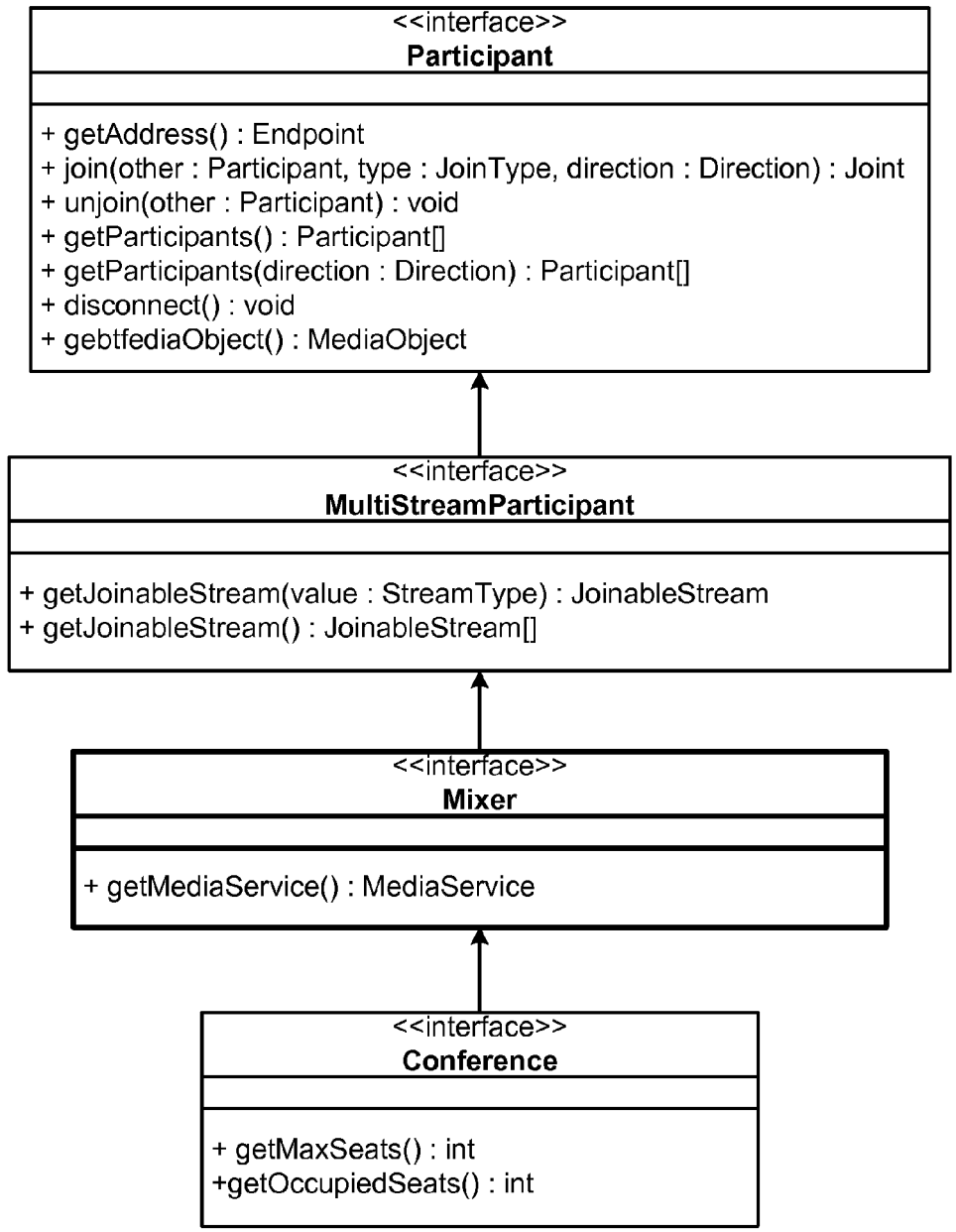
FIG. 9 illustrates the Conference object in a UML diagram.

FIG. 9 illustrates the Conference object in a UML diagram. It inherits from Mixer object which in turn inherits from MultistreamParticipant, which in turn inherits from Participant. The methods exposed are shown in their respective boxes.

The media control model of the unified communication framework assumes each call has media capabilities as long as its media streams are connected to a JSR 309 compliant media server. Once a call is in the INPROGRESS or CONNECTED state, getMediaService( ) can be used to access the media services. In case the media streams are connected in a DIRECT mode, (see for example FIG. 2A) the unified communication framework will try to reinvite the media streams back to the media server into a BRIDGE mode (see for example FIG. 2B.)

TABLE 2 lists example classes/objects related to media control of the unified communication framework in the preferred embodiment. MediaService defines all the media functions available to a call.

TABLE 2

| INTERFACE | DESCRIPTION |
|---|---|
| MediaService.input(...) | provides control on both DTMF and speech recognition |
| MediaService.output(...) | provides control on both TTS and media playback |
| MediaService.prompt(...) | allows the application to control both outputs and inputs at the same time |
| MediaService#record(...) | allows the application to record both inputs and outputs |

To use the media function on the Call, simply get the MediaService from the Call. If the media is not going through the server, the unified communication framework will try to re-invite the media back to the server if possible.

FIG. 10 illustrates the media service object in a UML diagram.

The unified framework programming model is an event-driven model. It has a coarse-grained event types to make the application focus on the business logic rather than the lower level protocol. It combines with a state-based event dispatching mechanism and one-thread-per-event source (in most cases) to make the application much easier to write.

Table 3 lists example classes/objects related to events of the unified communication framework in the preferred embodiment.

TABLE 3

| CLASS | DESCRIPTION |
|---|---|
| Eventsource | An EventSource is an object that can generate Events in Application. Applications can set application defined state on EventSource by calling #setApplicationState(String) setApplicationState(String) for single state or #setApplicationState(String,String) setApplicationState(String) for multiple concurrent states. |
| SignalEvent | Represents the events from underlying signaling protocol, such as SIP BYE, REFER, INVITE, etc. |
| MediaEvent | represents the events from progress and status of the execution of media functions. |
| Observer | a weak-typed listener that can listen on both SignalEvent and MediaEvent. The unified framework supports dispatching event to Observers based on event type and state. |

Figure 11:
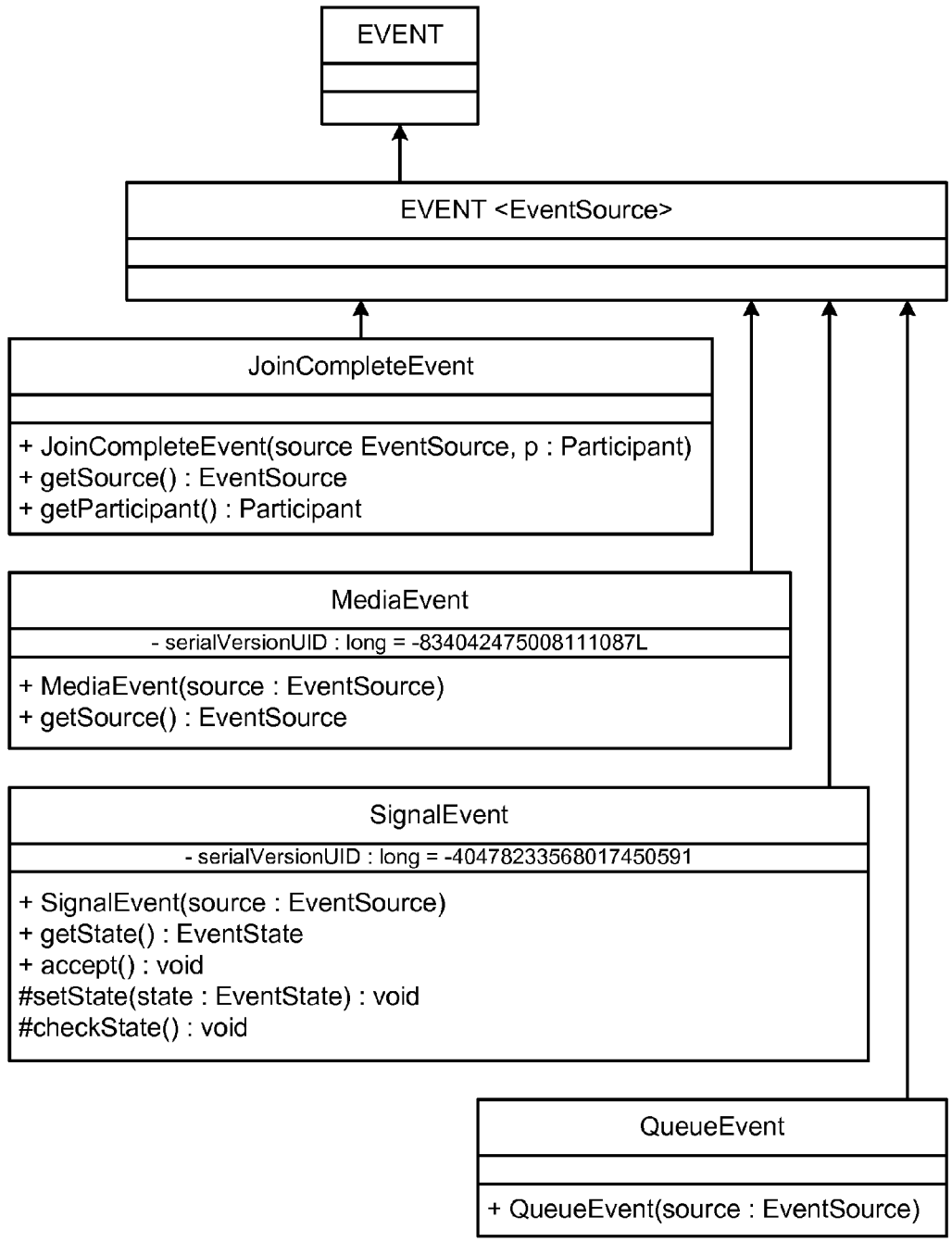
FIG. 11 illustrates the EventSource object in a UML diagram.

FIG. 11 illustrates the EventSource object in a UML diagram. The EventSource generates unified events from MediaEvent and SignalEvent objects.

Call controls can be performed on SignalEvent, such as accept. Almost all call control functions are modeled as synchronous methods for simplicity, given the fact that call control functions are finished within relative short time (e.g. max SIP timeout is about 32 seconds).

The media control functions, on the other hand, are modeled as asynchronous methods because media functions can be arbitrarily long. The result of any media function will be returned as MediaEvents. If an application wants to wait for a media function to complete before doing other actions. This can be easily achieved by Future.get( ) since a media function returns a Future to allow call to query its status.

Each Call is an Event Source that can generate both SignalEvent and MediaEvent. To get notified, the application has to add an Observer or an EventListener to the Call.

Event programming usually is associated with state management. The unified communication framework supports application-defined state based event dispatching. Application can setApplicationState on each EventSource. Concurrent states are also supported by call setApplicationState. The unified communication framework will dispatch the event to the appropriate Observer method based on its State annotation.

Each EventSource mostly likely has system state driven by underlying protocols. But these should be separated from application states. Application states are simply symbolic names, entirely managed by application.

The example below shows how MyObserverClass handles different InputCompleteEvent at different states. greetingHandler is called when an InputCompleteEvent is fired by the EventSource and that EventSource's application state is "greeting". Similarly, supportHandler and salesHandler are called when InputCompleteEvent is fired by the EventSource and that EventSource's application state is "support" and "sales" respectively.

```
public class MyObserverClass implements Observer {
    @State("greeting")
    public void greetingHandler(InputCompleteEvent input) {
        String value = input.getConcept( );
        if (value.equals("support")) {
            input.getEventSource( ).setApplicationState("support");
            // play support menu and wait for input
        }
        else if (value.equals("sales")) {
            input.getEventSource( ).setApplicationState("sales");
            // play support menu
        }
        else {
            // replay greeting
        }
    }
    @State("sales")
    public void salesHandler(InputCompleteEvent input) {
        // handle sales input
    }
```

-continued

```
    }
    @State("support")
    public void supportHandler(InputCompleteEvent input) {
        // handle support input
    }
}
```

Figure 12:
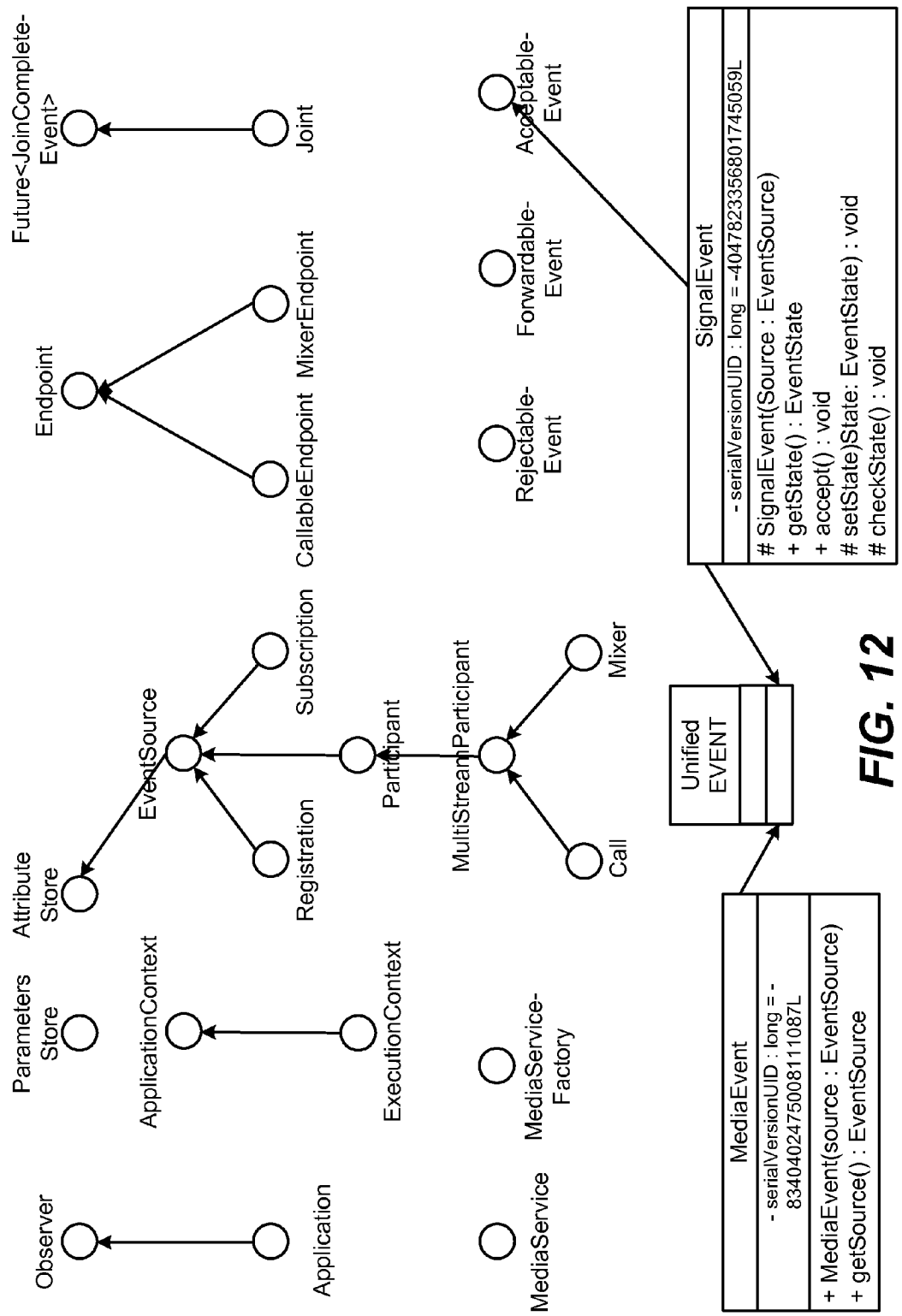
FIG. 12 illustrates the various classes in a preferred implementation of the unified communication framework.

FIG. 12 illustrates the various classes in a preferred implementation of the unified communication framework.

While the unified communication framework provides high-level, unified objects built from lower-level object of JSR 289/309, some of the unified objects can be mapped into JSR 289 or 309 objects, which allows the application to access the JSR 289/309 API directly. For example, Call is equivalent of SipSession in JSR 289 and NetworkConnection in JSR 309. MediaService is equivalent of MediaGroup in JSR 309. Mixer is equivalent of Mixer in JSR 309. In order to prevent lower level access from messing up the states in the unified framework, the lower level objects are to be accessed via preferably proxy objects.

The unified communication framework Package is a simply Java ARchive (JAR). A container supports loading the unified package should scan the package to find and load the implementation class of the Application interface. If multiple implementation classes exist, the implementation class can be designated by JAR's Manifest with an Application-Class entry. Otherwise, a random implementation class is loaded. If a JSR-289 container doesn't support loading the unified package directly, the unified communication framework should be packaged as standard SAR.

The following is an example of how compact the codes can be for an IVR application in the unified communication framework. The application developer needs not be concerned with low level controls and protocols and can simply focus on the business logic.

```
package com.voxeo.ufw.sample;
import com.voxeo.ufw.Application;
import com.voxeo.ufw.ApplicationContext;
import com.voxeo.ufw.Call;
import com.voxeo.ufw.MediaService;
import com.voxeo.ufw.State;
import com.voxeo.ufw.event.InputCompleteEvent;
import com.voxeo.ufw.event.InviteEvent;
public class IVR implements Application {
    @Override
    public void init(final ApplicationContext ctx) {
    }
    @Override
    public void destroy( ) {
    }
    @State
    public void handleInvite(final InviteEvent inv) throws Exception {
        final Call call = inv.acceptCall(this);
        call.join( ).get( );
        call.setApplicationState("menu-level-1");
        final MediaService mg = call.getMediaService(false);
        mg.prompt("1 for sales, 2 for support", "1,2", 0);
    }
    @State("menu-level-1")
    public void menu1(final InputCompleteEvent evt) {
        switch (evt.getCause( )) {
            case MATCH:
                final Call call = (Call) evt.getSource( );
                if (evt.getConcept( ).equals("1")) {
                    call.setApplicationState("menu-level-2-1");
                    call.getMediaService(false).prompt("1 for sipmethod, 2 for prophecy", "1,2", 0);
                }
                else {
                    call.setApplicationState("menu-level-2-2");
                    call.getMediaService(false).prompt("1 for sipmethod, 2 for prophecy", "1,2", 0);
```

-continued

```
            }
            break;
        }
    }
    @State("menu-level-2-1")
    public void menu21(final InputCompleteEvent evt) {
        switch (evt.getCause()) {
            case MATCH:
                final Call call = (Call) evt.getSource();
                if (evt.getConcept().equals("1")) {
                    call.setApplicationState("menu-simpmethod-sales");
                    call.getMediaService(false).prompt("thank you for calling sipmethod sales", null, 0);
                }
                else {
                    call.setApplicationState("menu-prophecy-sales");
                    call.getMediaService(false).prompt("thank you for calling prophecy sales", null, 0);
                }
                break;
        }
    }
    @State("menu-level-2-2")
    public void menu22(final InputCompleteEvent evt) {
        switch (evt.getCause()) {
            case MATCH:
                final Call call = (Call) evt.getSource();
                if (evt.getConcept().equals("1")) {
                    call.setApplicationState("menu-simpmethod-support");
                    call.getMediaService(false).prompt("thank you for calling sipmethod support", null, 0);
                }
                else {
                    call.setApplicationState("menu-prophecy-support");
                    call.getMediaService(false).prompt("thank you for calling prophecy support", null, 0);
                }
                break;
        }
    }
}
```

While the embodiments of this invention that have been described are the preferred implementations, those skilled in the art will understand that variations thereof may also be possible.

It is claimed:

1. A server including a processor, the server comprising:
    a communication application being executed on a Java virtual machine on said server;
    a unified application framework for call control and media control for building application components of the communication application
    a call control API for providing a standardized Java interface for call control, said call control API defining a set of class object primitives for call control;
    a media control API for providing a standardized Java interface for media server control, said media control API defining a set of class object primitives for media control;
    a unified call control and media control API defining a set of unified class objects constructed from the class object primitives of the call control API and the media control API; and
    wherein the application components are built from the unified class objects including:
        a Call object for connecting a leg of communication between an endpoint and the communication application;
        a Participant object representing an abstract party involved in a conversation;
        a Join object for effecting an asynchronous join operation on the Participant object;
        a MediaService object for media control available to a call;
        an Eventsource object for representing an event source that serializes events from call control and events from media control such that the application component listening said event source only has to deal with one event at a time; and
        an Observer object for a listener that listen to events from the event source.

2. The server as in claim 1, wherein the application components are built from the unified class objects as well as from the class object primitives of the call control API.

3. The server as in claim 1, wherein the application components are built from the unified class objects as well as from the class object primitives of the media control API.

4. The server as in claim 1, wherein said unified class objects are based on a specific object model that dictates certain predefined constructs of the class object primitives of the call control API and the media control API.

5. The server as in claim 1, wherein said unified class objects include the Observer object as a unified event handler that respond on predefined application state conforming to the specific object model.

6. The server as in claim 1, wherein said unified class objects include the Observer object as a unified event handler that ignores events inappropriate to a context of the specific object model.

7. The server as in claim 1, wherein said observer object specifies a type of event and a state of the application.

8. The server as in claim 1, wherein the application components are part of an interactive voice response application.

9. The server as in claim 1, wherein the application components are part of a self-help application.

10. A method of operating a server, comprising:
providing a call control API for providing a standardized Java interface for call control under SIP and defining a set of class object primitives for call control;
providing a media control API, the media control API providing a standardized Java interface for media server control and defining a set of class object primitives for media control;
constructing a unified call control and media control API defining a set of unified class objects from the class object primitives of the call control API and the media control API;
deploying an application having components built from the set of unified class objects including:
- a Call object for connecting a leg of communication between an endpoint and the communication application;
- a Participant object representing an abstract party involved in a conversation;
- a Join object for effecting an asynchronous join operation on the Participant object;
- a MediaService object for media control available to a call;
- an Eventsource object for representing an event source that serializes events from call control and events from media control such that the application component listening said event source only has to deal with one event at a time; and
- an Observer object for a listener that listen to events from the event source; and executing the application on a Java virtual machine on said server.

11. The method as in claim 10, wherein the application components are built from the unified class objects as well as from the class object primitives of the call control API.

12. The method as in claim 10, wherein the application components are built from the unified class objects as well as from the class object primitives of the media control API.

13. The method as in claim 10, wherein said unified class objects are based on a specific object model that dictates certain predefined constructs of the class object primitives of the call control API and the media control API.

14. The method as in claim 10, wherein said unified class objects include the Observer object as a unified event handler that respond on predefined application state conforming to the specific object model.

15. The method as in claim 10, wherein said unified class objects include the Observer object as a unified event handler that ignores events inappropriate to a context of the specific object model.

16. The method as in claim 10, wherein said observer object specifies a type of event and a state of the application.

17. The method as in claim 10, wherein the application components are part of an interactive voice response application.

18. The method as in claim 10, wherein the application components are part of a self-help application.

* * * * *